United States Patent
Ecker et al.

(10) Patent No.: US 11,978,214 B2
(45) Date of Patent: May 7, 2024

(54) METHOD AND APPARATUS FOR DETECTING EDGES IN ACTIVE STEREO IMAGES

(71) Applicant: INUITIVE LTD., Raanana (IL)

(72) Inventors: Ady Ecker, Ness Ziona (IL); Niv Shmueli, Ramat Hasharon (IL)

(73) Assignee: INUITIVE LTD., Raanana (IL)

( * ) Notice: Subject to any disclaimer, the term of this patent is extended or adjusted under 35 U.S.C. 154(b) by 214 days.

(21) Appl. No.: 17/578,769

(22) Filed: Jan. 19, 2022

(65) Prior Publication Data

US 2022/0237804 A1 Jul. 28, 2022

Related U.S. Application Data

(60) Provisional application No. 63/140,877, filed on Jan. 24, 2021.

(51) Int. Cl.
| | |
|---|---|
| *G06T 7/13* | (2017.01) |
| *G06T 5/00* | (2006.01) |
| *G06T 5/20* | (2006.01) |
| *G06T 7/521* | (2017.01) |
| *H04N 13/207* | (2018.01) |
| *H04N 13/254* | (2018.01) |
| *H04N 13/271* | (2018.01) |

(52) U.S. Cl.
CPC ............... *G06T 7/13* (2017.01); *G06T 5/005* (2013.01); *G06T 5/20* (2013.01); *G06T 7/521* (2017.01); *H04N 13/207* (2018.05); *H04N 13/254* (2018.05); *H04N 13/271* (2018.05); *G06T 2207/10012* (2013.01); *G06T 2207/20028* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 2012/0114225 A1 | 5/2012 | Lim et al. | |
| 2012/0269458 A1 | 10/2012 | Graziosi et al. | |
| 2017/0278289 A1* | 9/2017 | Marino | G06T 7/536 |
| 2019/0066315 A1* | 2/2019 | Bleyer | G06T 7/521 |

\* cited by examiner

*Primary Examiner* — Xiaolan Xu
(74) *Attorney, Agent, or Firm* — Browdy and Neimark, PLLC

(57) ABSTRACT

A method and apparatus for generating a three-dimensional depth map, are provided. The method comprising the steps of: (i) illuminating a target by a pattern projector having background intensity or by a combination of a pattern projector which does not have a background intensity operative together with a flood projector; (ii) capturing at least one image that comprises one or more objects present at the illuminated target; (iii) converting the at least one captured image into data; (iv) processing the data received from the conversion of the at least one captured image while filtering out the projected pattern from the processed data; (v) detecting edges of at least one of the one or more objects present at the illuminated target; and (vi) generating a three-dimensional depth map that comprises the at least one of the one or more objects whose edges have been determined.

15 Claims, 4 Drawing Sheets

METHOD AND APPARATUS FOR DETECTING EDGES IN ACTIVE STEREO IMAGES

TECHNICAL FIELD

The present disclosure generally relates to methods for using optical devices, and more particularly, to processing of images of scenes that are illuminated by a pattern projector.

BACKGROUND

A stereoscopic camera arrangement is an element made of two camera units, assembled in a stereoscopic module. Stereoscopy (also referred to as "stereoscopics" or "3D imaging") is a technique for determining the depth in an image by means of stereopsis. In other words, it is the impression of depth that is perceived when a scene is viewed with both eyes by someone with normal binocular vision which is responsible for creating two slightly different images of the scene in the two eyes due to the eyes'/camera's different locations.

Active stereo vision is a form of stereo vision which actively employs a light emitting device such as a laser diode or a device configured to emit structured light (e.g., patterned light) in order to simplify the stereo matching problem.

One of the problems associated with this type of technology is edge detection, which is an important factor in detecting boundaries of objects that are included in an image retrieved by using a stereoscopic camera arrangement. Detecting edge boundaries can improve the matching process between images retrieved from the two cameras, since matching windows might be cropped by edge boundaries (pixels located outside the edge boundaries can belong to an object/environment located at different depth, or disparity), hence it will not be matched together with pixels present within a matching window, that are assumed to have a very similar depth or disparity therebetween. In addition, edges can be used in a post-processing stage to improve the resulting 3D depth maps obtained.

There are a number of problems associated with such processing of edges in active stereoscopic images. To name but few, the edge intensity decreases along with increasing the distance from the camera arrangement, most edges included in an image retrieved while applying a device configured to emit structured light, belong to the projected pattern rather than the object's edges, the pattern density is too low to specify object boundaries at the resolution of pixels. One of the options to deal with this problem is using projectors provided with increased background light intensity to enable detection of edges within the active image.

A number of solutions have been suggested in the art in order to address edge detection problems. Some of these solutions are:

US 20120114225 discloses an image processing apparatus that detects an occlusion boundary between objects within a depth image, by applying an edge detection algorithm to the depth image. The image processing apparatus classifies the occlusion boundary into a foreground region boundary and a background region boundary using a depth gradient vector direction of the occlusion boundary, and extraction of an occlusion region of the input depth image using the foreground region boundary.

US 20120269458 describes a method which interpolates and filters a depth image with reduced resolution to recover a high-resolution depth image using edge information, wherein each depth image includes an array of pixels at locations and wherein each pixel has a depth. The reduced depth image is first up-sampled, interpolating the missing positions by repeating the nearest-neighboring depth value. Next, a moving window is applied to the pixels in the up-sampled depth image. The window covers a set of pixels centered at each pixel. The pixels covered by the window are selected according to their relative offset to the depth edge, and only pixels that are within the same side of the depth edge of the center pixel are used for the filtering procedure.

However, the problem that needs to be solved is to detect edges comprised within captured images of scenes that are illuminated by a pattern projector in an active stereo implementation.

The present invention proposes a solution for implementing a new edge detection mechanism in such cases.

SUMMARY OF THE DISCLOSURE

The disclosure may be summarized by referring to the appended claims.

It is an object of the present disclosure to provide a method and apparatus that enable removal of a projected pattern from an image being processed, while preserving edge locations thereat.

It is another object of the present disclosure to provide a method and apparatus for detecting objects' edges within images that comprise a background pattern.

It is another object of the present disclosure to provide a method and apparatus for generating a three-dimensional depth map having a high quality of the edges of the objects comprised in that image.

It is another object of the present disclosure to provide a method and apparatus for eliminating data associated with a projected pattern that is included as part of a scene captured by the stereoscopic apparatus.

Other objects of the present invention will become apparent from the following description.

According to a first embodiment of the disclosure, there is provided a method for generating a three-dimensional depth map, comprising the steps of:
(i) illuminating a target by a pattern projector having a background intensity or by a combination of a pattern projector which does not have a background intensity operative together with a flood projector;
(ii) capturing at least one image that comprises one or more objects present at the illuminated target;
(iii) converting the at least one captured image into data;
(iv) processing the data received from the conversion of the at least one captured image and filtering out the projected pattern from the processed data;
(v) detecting edges of at least one of the one or more objects present at the illuminated target; and
(vi) generating a three-dimensional depth map that comprises the at least one of the one or more objects whose edges have been determined.

The term "having background intensity" as used herein throughout the specification and claims when associated with a projector, should be understood to be related to a projector, capable of emitting background illumination at a non-zero intensity.

The term "active stereo image" as used herein throughout the specification and claims should be understood to encompass both active stereo images and/or structured light images.

In accordance with the present disclosure, the edges are detected using the background intensity, after removing the projected pattern. (e.g., a spots pattern, a line stripes pattern, and the like) comprised within the images captured by the image capturing devices. In other words, the background intensity provides edges at the pixel-resolution.

According to another embodiment, the step of detecting edges of at least one of the one or more objects present at the illuminated target, is carried out by detecting non-pattern edges comprised in the at least one image.

In accordance with another embodiment, step (iv) is carried out by applying an algorithm configured to detect blobs comprised in the at least one image.

The term "blob" as used herein throughout the specification and claims is used to denote a connected component of pixels that are strongly illuminated by the pattern projector (as opposed to the background which is weakly illuminated). The shape of a blob is not restricted to a rounded shape and can be at any applicable shape. A respective algorithm that will be implemented as described through the present specification should be selected in accordance with that shape.

By yet another embodiment, step (iv) further comprises filling pixels that belong to the projected pattern of each pattern blob, and determining a minimum value of all pixels comprised in such a blob.

According to still another embodiment, the method provided further comprises the following steps for each pixel comprised in a certain blob:
(a) collecting data that pertains to all pixels that are comprised within a square window located around that pixel;
(b) removing from the collected data, all data that pertains to pixels having a gray level value that is higher than the minimum value of all pixel comprised in that certain blob;
(c) applying a bilateral filter on collected data that has not been removed in step (b); and
(d) the following steps are carried out on an entire captured image:
  (d1) applying an operator on the results obtained, wherein the operator is configured to enable removal of a projected pattern from the captured image while preserving edge locations thereat. Such an operator may be for example an applicable opening operator; and
  (d2) applying an edge detection operator (for example a Canny edge detector) to detect a wide range of edges in the captured image, on the pattern-free data.

In accordance with yet another embodiment, the method provided further comprises a step of determining key-points in actively-illuminated images such as intersections of lines (e.g., straight lines) detected in the background of the pattern, and the like. Straight lines can be fitted to edge lines where such a fitting is appropriate (e.g., the edge is nearly linear), in order to detect suitable straight edges on straight objects. In addition, or in the alternative, key-points (also known as points of interest) may be detected within images having certain defined pattern, e.g., by intersecting straight lines. The advantage of implementing the key-point detection method is that it allows registration of frames in time. This issue presents a problem when dealing with active stereo systems, since the pattern moves along with the projector, which means that identifying the key-points in different frames is quite a challenge. This latter option enables the implementation of another embodiment of the disclosure, by which interest points (e.g., edge points, key-points) are detected by using background intensity in active stereo images.

According to another aspect of the present disclosure there is provided an apparatus configured to generate a three-dimensional depth map, wherein the apparatus comprises:
at least one projector being a pattern projector having background intensity or a combination of a pattern projector which does not have a background intensity configured to operate together with a flood projector, adapted to illuminate a target where one or more objects are present, while projecting the pattern thereat;
at least one image capturing sensor, configured to capture at least one image that comprises the one or more objects present at the illuminated target; and
at least one processor configured to operate on the at least one image captured by the at least one image capturing sensor, and to:
  (a) process the at least one captured image and convert it into data;
  (b) filter out the projected pattern from the processed data;
  (c) detect edges of at least one of the one or more objects present at the illuminated target; and
  (d) generate a three-dimensional depth map that comprises the at least one of the one or more objects whose edges have been detected.

As will be appreciated by those skilled in the art, typically when implementing the solution provided by the present invention while using an active stereo set-up, two camera sensors will be used, whereas when implementing the solution provided by the present invention while using a structured light set-up, one camera sensor will be used.

In accordance with another embodiment, the at least one processor is configured to filter out the projected pattern from the processed data by applying an algorithm operative to detect blobs comprised in the at least one image. In accordance with still another embodiment, the at least one processor is configured to carry out the following steps for each pixel comprised in a certain blob:
(a) collecting data that pertains to all pixels that are comprised within a square window located around that pixel;
(b) removing from the collected information, all data that pertains to pixels having a gray level value that is higher than the minimum value of all pixel comprised in said certain blob;
(c) applying a bilateral filter on collected data that has not been removed in step (b) to fill the blob with temporary values; and
(d) the processor is further configured to carry out the following steps on an entire captured image:
  (d1) applying an operator on the results obtained, wherein the operator is configured to enable removal of a projected pattern from the captured image while preserving edge locations thereat; and
  (d2) applying an edge detection operator to detect a wide range of edges in the captured image, on the pattern-free data.

According to another embodiment of this aspect of the disclosure, the at least one processor is further configured to determine key-points in actively-illuminated pattern-free images. For example, key-points are intersections of lines (such as straight lines) detected in a projected pattern's background.

BRIEF DESCRIPTION OF THE DRAWINGS

For a more complete understanding of the present invention, reference is now made to the following detailed description taken in conjunction with the accompanying drawing wherein.

DETAILED DESCRIPTION

Figure 1:
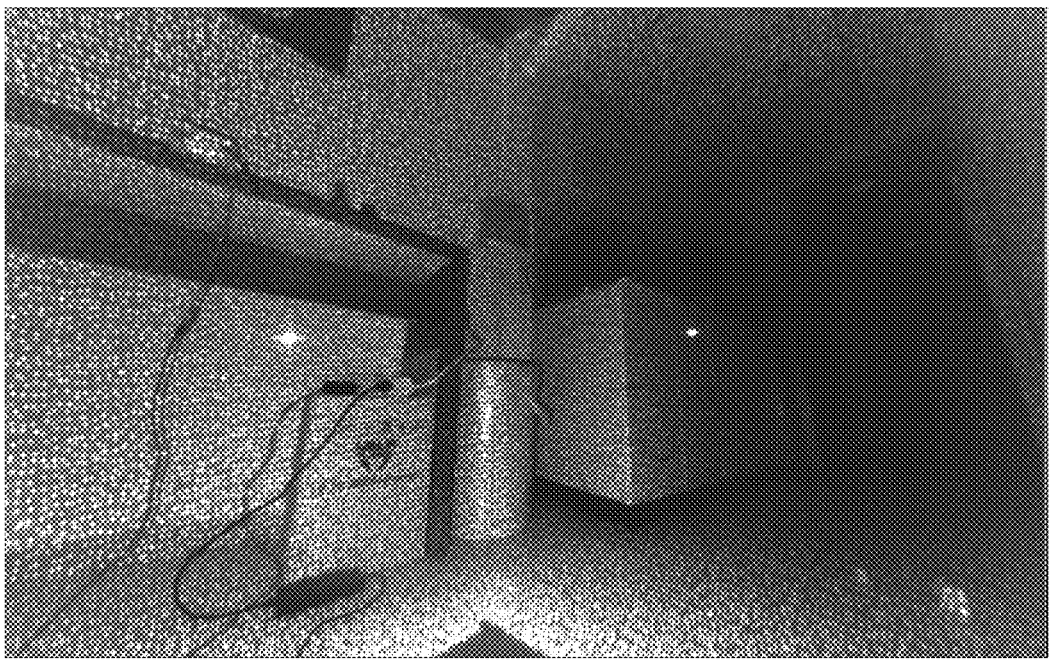
FIG. 1—illustrates an example of a scene captured by a stereoscopic image capturing arrangement.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Known patterns are often projected by structured-light sensors or active stereo sensors onto a scene. The deformation of these known patterns as it appears to the sensor camera when the pattern strikes surfaces, allows vision systems to calculate depth and surface information of the objects present in the scene, as used for example in structured light 3D scanners.

A pattern projector may comprise a light source, one or more optical components, and a package (housing). The purpose of this device is to project a light pattern. This typically may be achieved by manipulating light emitted from a source or an array of sources, and shaping it into the desired pattern at the desired intensity. In numerous projector modules, a laser or array of lasers are utilized, optionally a lens and a pattern-shaping element, a micro-structured optical element, such as a diffuser or DOE.

The main problem which the present disclosure addresses is detection of edges comprised within captured images of scenes that are illuminated by a pattern projector for active stereo or a structured light projector. Detection of these edges may assist in refining the edges of the depth map obtained by using active stereo or structure light, either by taking them into account in the stereo matching process or as a post-process cleaning phase.

To do that, the present invention suggests using the projector's background intensity. Certain projectors include this background intensity as a "built-in" feature, while for other projectors that do not have such a background intensity feature, it can be added by using a flood projector.

The main issues that have to be addressed for solving this problem, are:
1. Detection of both close and far edges,
2. Ignoring/eliminating spot edges; and
3. If the projector's pattern is "removed" while processing the captured image, it has to be in a way that would not introduce new edges to the image. Moreover, any pattern-removal process should preferably avoid moving the location of the background edges, or otherwise have them moved as little as possible.

As already explained, the underlying idea of the solution provided by the present invention is to detect edges included in a stereoscopic image having a pattern generated by a pattern projector. There are a number of ways that may be used to implement this idea. For example, an intuitive approach may be to alternate between passive and active images, or between images that include the projected pattern and images that were generated while a flood projector was operative, and then to remove the edges from the images, without the spots. However, the inherent disadvantage of such method is that there could be motion of objects between consecutive frames, and in order to implement the above solutions for such cases, it would be required to include a memory to store the frames and eliminate the motion effects therefrom. Obviously, such a solution is rather complicated to be implemented in a hardware system.

FIG. 1 presents an example of a scene captured by a stereoscopic image capturing arrangement. This scene (i.e., image) will be used in the following description for implementing a processing technique construed in accordance with an embodiment of the invention.

The processing of the image in order to detect the edges and process the image accordingly, may preferably be done by using an apparatus as claimed by the present invention, which comprises the two image capturing devices and a processor (e.g., on a chip). Alternatively, it can be carried out by within the image capturing devices (the camera devices) if the latter comprises a processing unit, or by applying a software while using a computer (e.g., a laptop, a desktop computer etc.) after the images were retrieved from the image capturing devices. It should be understood that all these options are encompassed by the scope of the present invention.

Figure 2:
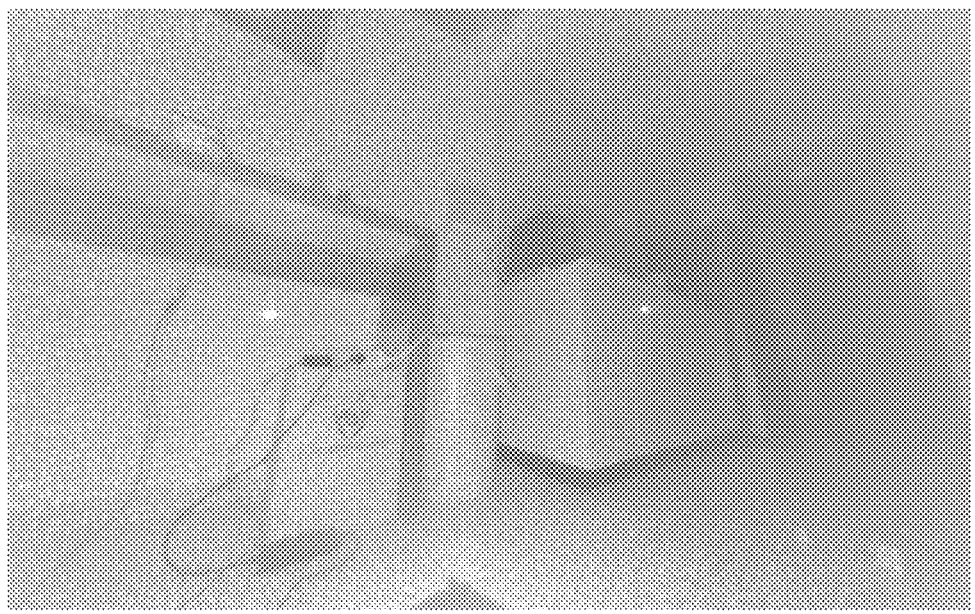
FIG. 2—is the result obtained by applying a log transformation onto the image depicted in FIG. 1.

FIG. 2 demonstrates the result obtained by applying a log transformation onto the image depicted in FIG. 1, in order to detect the relative intensity of edges comprised in that image.

The general approach, on which the solution provided by the present invention is based, is filtering out the projected pattern. This filtering is carried out as most edges depicted in the image being processed, belong to the projected pattern and not to the object's edges (as shown in FIG. 1). The filtering phase is carried out in conjunction with coordinating an appropriate algorithm with the projected pattern.

Following is an example of a method construed in accordance with an embodiment of the present disclosure, by which first a log transformation is applied onto the image in order to detect strength of the relative intensity edges as shown in FIG. 2. Next, applying a segmentation algorithm on the results obtained, in order to detect spot blobs of the pattern, for example, MSER (Maximally Stable Extremal Regions) algorithm. The chosen algorithm should be one that is configured to enable blob detection in images. The term "blob detection" as used herein throughout the specification and claims is used to denote a method that is directed at detecting regions in a digital representation of an image that differ in properties, such as brightness or color, when compared with surrounding regions. Typically, a blob is a region of an image in which some properties are constant or approximately constant and all the points in a blob may be considered in some sense to be similar to each other.

Next, the pattern pixels in each pattern blob are filled, and the minimum value of all pixel in the blob is found.

Figure 3:
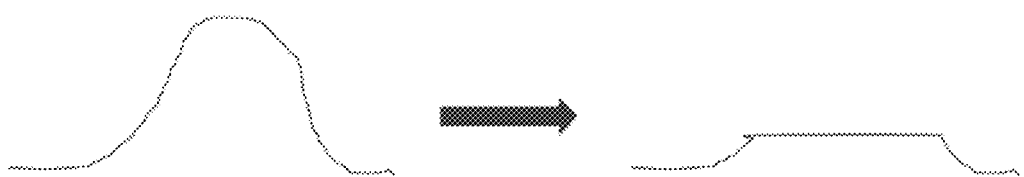
FIG. 3—exemplifies the result obtained by applying a bilateral filter on collected data in order to get a fill-in value for the blob, according to an embodiment construed in accordance with the present invention.
Figure 4:
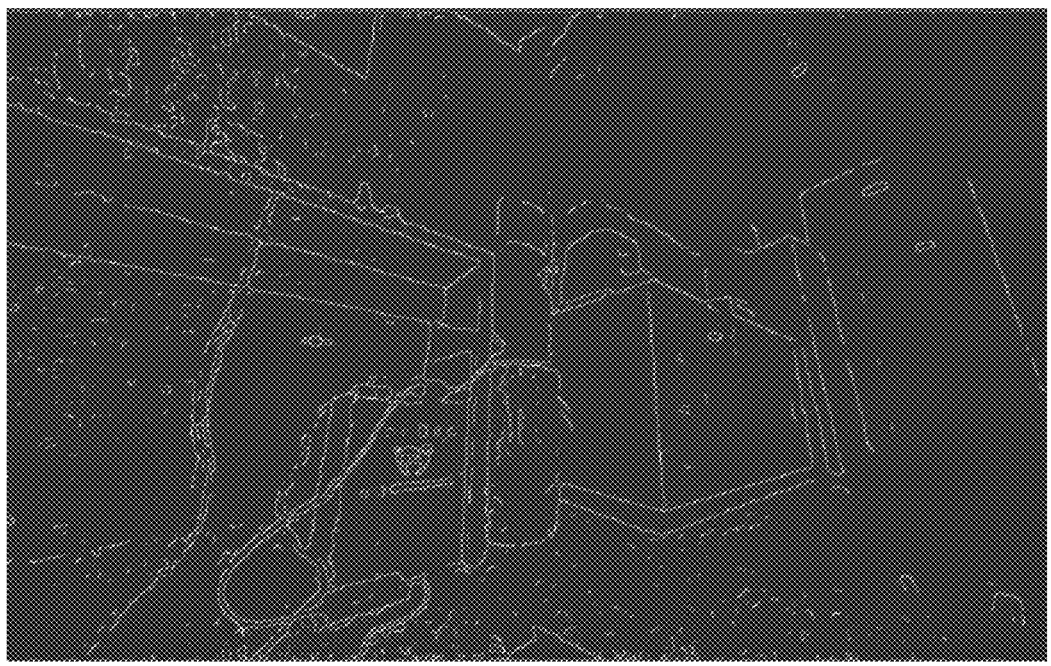
FIG. 4—exemplifies a final edge map.
Figure 5:
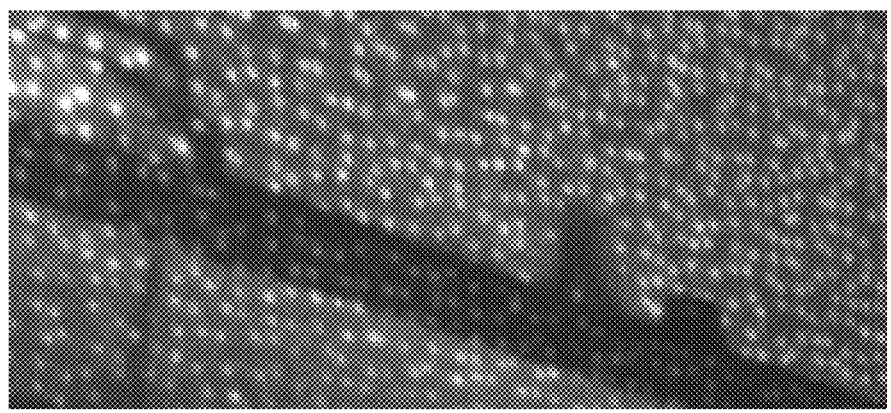
FIG. 5—exemplifies a zoom-in on an interesting region within the image exemplified in of FIG. 1.
Figure 6:
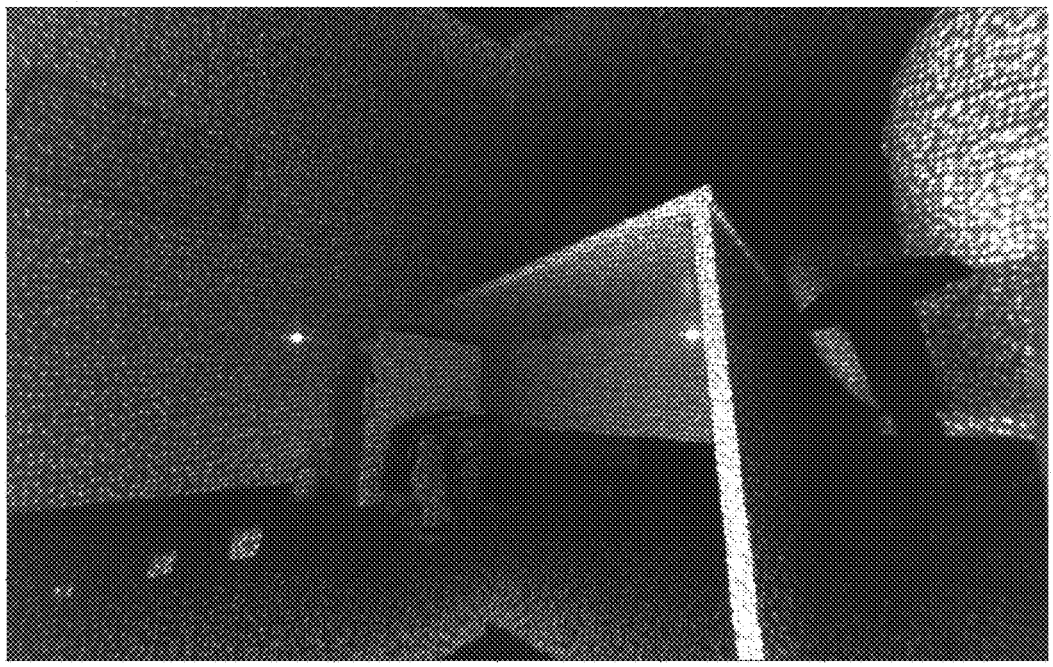
FIG. 6—exemplifies a second example of an input image.
Figure 7:
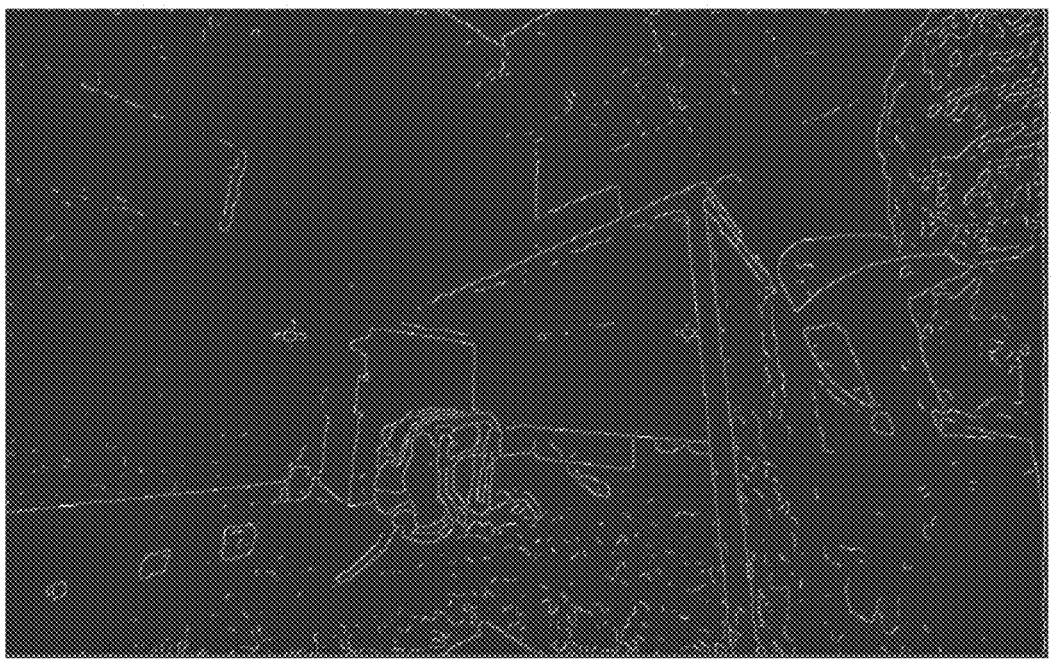
FIG. 7—exemplifies a final edge map of the example depicted in FIG. 6.
Figure 8:
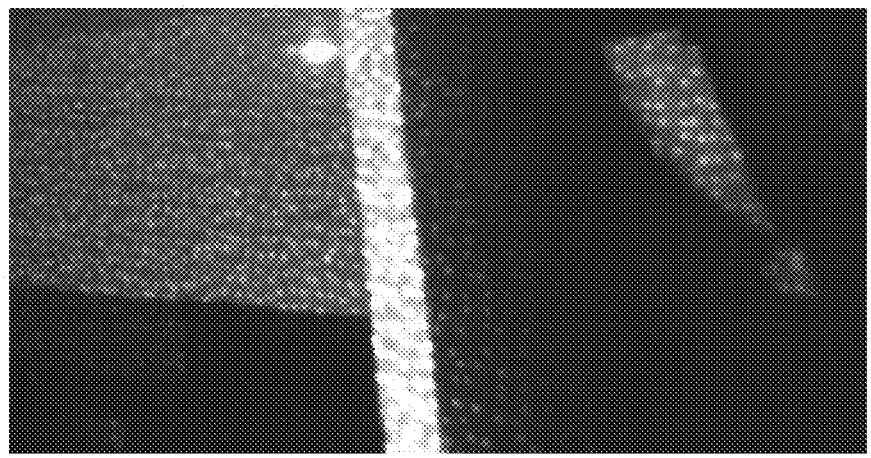
FIG. 8—shows a zoom-in on an interesting region within FIG. 6.
Figure 9:
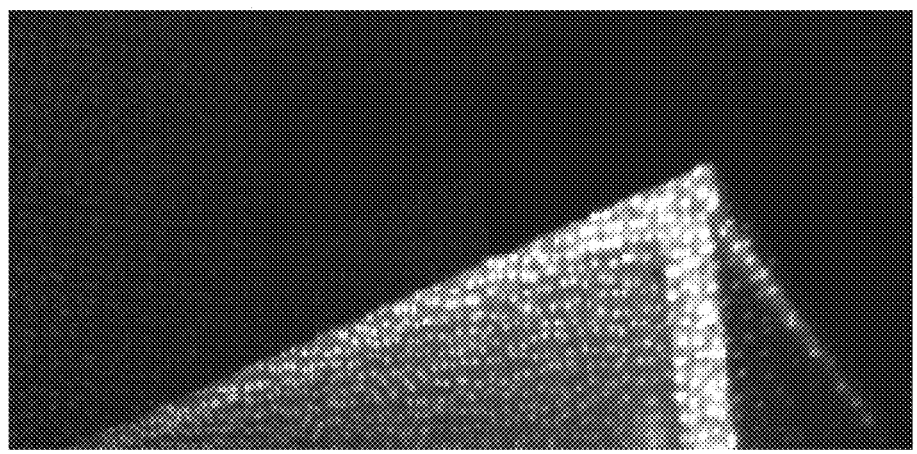
FIG. 9—shows zoom-in on interesting region of FIG. 6.

Now, for each blob pixel, the following steps are carried out:
  (i) collect information that pertains to all pixels that are comprised within a square window located around that pixel;
  (ii) remove from the collected information, all information that pertains to pixels having a gray level value that is higher than the minimum value of all pixel in the blob that was found. This step is directed to ensure that only non-pattern pixels are used;
  (iii) apply a bilateral filter on collected information that has not been removed in step (ii) in order to get a fill-in value (FIG. 3);

Next, the method provided may optionally further include the following steps, which are implemented on the entire captured image, namely:
  applying an opening operator using a counter-harmonic filter on the result obtained, as disclosed for example in Jesus Angulo, "Morphological bilateral filtering", SIAM J. of Imaging Sciences, July 2013.

Optionally, a gray-scale operator is:

$$g(x) = \frac{\sum g(y)^{P+1} e^{-(g(x)-g(y))^2/2\sigma_g} e^{-(x-y)^2/2\sigma_d}}{\sum g(y)^{P} e^{-(g(x)-g(y))^2/2\sigma_g} e^{-(x-y)^2/2\sigma_d}}$$

As required while using the opening operator, the filter is preferably applied twice, once while using −p (soft min, erosion), and once with +p (soft max, dilation), in order to get a "soft opening" operation on the image. This operation causes spots in the pattern to disappear while edge location is preserved;
and
  applying an edge detection operator (for example some variant of the Canny edge detector) to detect a wide range of edges in the captured image, on the pattern-free data.

According to another embodiment of the present invention, the method provided further comprises a step of determining key-points in the image being processed.

Examples of such key-points may be for example intersections of straight lines in the pattern-free image.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for generating a three-dimensional depth map, comprising the steps of:
  (i) illuminating a target by a pattern projector having background intensity or by a combination of a pattern projector which does not have a background intensity operative together with a flood projector;
  (ii) capturing at least one image that comprises one or more objects present at the illuminated target, wherein said at least one image of at least one of said one or more objects comprises spots;
  (iii) converting the at least one captured image into data by applying a log transformation onto said at least one captured image;
  (iv) processing the data received from the conversion of the at least one captured image by applying a gray-scale opening operator using a counter-harmonic filter on the data being processed, thereby causing spots in the data associated with projected pattern of the captured image to disappear, while perserving edge locations of the one or more objects included in the captured image;
  (v) applying an edge detection operator to detect edges in the pattern-free data associated with the captured image, of at least one of the one or more objects present at the illuminated target; and
  (vi) generating a three-dimensional depth map that comprises the at least one of the one or more objects whose edges have been determined.

2. The method of claim 1, wherein the step of detecting edges of at least one of the one or more objects present at the illuminated target, is carried out by detecting non-pattern edges comprised in said at least one image.

3. The method of claim 1, wherein step (iv) is carried out by applying an algorithm configured to detect blobs comprised in said at least one image.

4. The method of claim 3, wherein step (iv) further comprises filling pixels that belong to the projected pattern of each pattern blob, and determining a minimum value of all pixels comprised in such a blob.

5. The method of claim 4, further comprising the following steps for each pixel comprised in a certain blob:
  (a) collecting data that pertains to all pixels that are comprised within a square window located around that pixel;
  (b) removing from the collected information, all data that pertains to pixels having a gray level value that is higher than the minimum value of all pixels comprised in said certain blob;
  (c) applying a bilateral filter on collected data that has not been removed in step (b).

6. The method of claim 5, further comprising the following steps that are carried out on an entire captured image:
  (d1) applying an operator on the results obtained, wherein the operator is configured to enable removal of a projected pattern from the captured image while preserving edge locations thereat; and
  (d2) applying an edge detection operator in order to detect a wide range of edges in the captured image, on the pattern-free data.

7. The method of claim 6, further comprising a step of determining key-points in actively-illuminated pattern-free images.

8. The method of claim 7, wherein said key-points are intersections of lines detected in a projected pattern's background.

9. An apparatus configured to generate a three-dimensional depth map, wherein the apparatus comprising:
  at least one projector being a pattern projector having background intensity or a combination of a pattern projector which does not have a background intensity configured to operate together with a flood projector, adapted to illuminate a target where one or more objects are present, while projecting the pattern thereat;

at least one image capturing sensor, configured to capture an image that comprises the one or more objects present at the illuminated target, wherein said at least one image of at least one of said one or more objects comprises spots; and at least one processor configured to operate on the image captured by the at least one image capturing sensor, and to:

(a) process the at least one captured image and convert it into processed data by applying a log transformation onto said at least one captured image;

(b) apply a gray-scale opening operator using a counter-harmonic filter on the data being processed, thereby causing spots in the data associated with projected pattern of the captured image to disappear, while preserving edge locations of the one or more objects included in the captured image;

(c) determine edges in the pattern-free data associated with the captured image, of at least one of the one or more objects present at the illuminated target; and (d) generate a three-dimensional depth map that comprises the at least one of the one or more objects whose edges have been determined.

10. The apparatus of claim 9, wherein the at least one processor is configured to filter out the projected pattern from the processed data.

11. The apparatus of claim 10, wherein the at least one processor is configured to detect edges of at least one of the one or more objects present at the illuminated target, by detecting non-pattern edges comprised in said at least one image.

12. The apparatus of claim 9, wherein the at least one processor is configured to filter out the projected pattern from the processed data by applying an algorithm operative to detect blobs comprised in said at least one image.

13. The apparatus of claim 12, wherein the at least one processor is configured to fill pixels that belong to the projected pattern of each pattern blob, and to determine a minimum value of all pixels comprised in such a blob.

14. The apparatus of claim 9, wherein the at least one processor is further configured to determine key-points in actively-illuminated pattern-free images.

15. The apparatus of claim 14, wherein said key-points are intersections of lines detected in a projected pattern's background.

* * * * *